(12) United States Patent
Nikander

(10) Patent No.: US 7,996,675 B2
(45) Date of Patent: Aug. 9, 2011

(54) HOST IDENTITY PROTOCOL METHOD AND APPARATUS

(75) Inventor: Pekka Nikander, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 818 days.

(21) Appl. No.: 11/917,099

(22) PCT Filed: Jun. 17, 2005

(86) PCT No.: PCT/EP2005/052839
§ 371 (c)(1),
(2), (4) Date: Jan. 9, 2008

(87) PCT Pub. No.: WO2006/133740
PCT Pub. Date: Dec. 21, 2006

(65) Prior Publication Data
US 2008/0195865 A1 Aug. 14, 2008

(51) Int. Cl.
*G06F 21/00* (2006.01)
(52) U.S. Cl. .................. 713/168; 726/8; 726/9; 726/10
(58) Field of Classification Search .................. 713/168, 713/169; 726/8, 9, 10
See application file for complete search history.

(56) References Cited

U.S. PATENT DOCUMENTS

2007/0204150 A1* 8/2007 Jokela et al. .................. 713/161
2007/0274312 A1* 11/2007 Salmela et al. ............... 370/392

FOREIGN PATENT DOCUMENTS

WO    WO 2005/101753 A1 * 10/2005

OTHER PUBLICATIONS

Lars Jessen Roost et al. The Host Identity Protocol: An Experimental Evaluation. Spring 2005. Aalborg University. p. 1-126.*
Pekka Nikander. Host Identity Protocol. Feb. 23, 2005. p. 1-55.*
R. Moskowitz & P. Nikander. RFC 4423: Host Identity Protocol (HIP) Architecture. May 2006. p. 1-25.*
Thomas R. Henderson et al. Experience with the Host Identity Protocol for Secure Host Mobility and Multihoming. 2003. IEEE. 2120-2125.*
R. Moskowitz. Internet Draft: Host Identity Payload and Protocol. Nov. 2001. p. 1-33.*
Ren Yan Zhang Hongke Zhang Sidong IP Lab et al: "A proposal to replace HP base exchange with IKE-H method; draft-yan-hip-ike-h-01.txt;" IETF Standard-Working-Draft, Internet Engineering Task Force, IETF, CH, No. 1, May 10, 2005.

* cited by examiner

*Primary Examiner* — Christian LaForgia

(57) ABSTRACT

A modified Host Identity Protocol, HIP, base exchange method is provided for use by first and second HIP hosts (Initiator and Responder) having a shared state from a pre-existing relationship. In the modified HIP base exchange method, an authentication message (I2') is sent (S2) from the first host (Initiator) to the second host (Responder) comprising an identifier (HITI) of the first host (Initiator) and a cryptographic item (PF). The authentication message (I2') is received (S3) at the second host (Responder). Following receipt, the identifier and information relating to the shared state are used (S4) to authenticate the cryptographic item (PF). If the cryptographic item, and the rest of the authentication message, is authenticated, a confirmation message (R2') is sent from the second host (Responder) to the first host (Initiator) to indicate successful authentication. These two messages (I2' and R2') are equivalent to the I2 and R2 messages of the standard HIP base exchange protocol, and the requirement for the I1 and R1 messages from the standard HIP base exchange protocol is eliminated.

42 Claims, 4 Drawing Sheets

Logical new packet structure

Actual packet structure after the HIP negotiation

HOST IDENTITY PROTOCOL METHOD AND APPARATUS

BACKGROUND OF THE INVENTION

1. Field of the Invention

The present invention relates to a Host Identity Protocol Method and Apparatus.

2. Description of the Related Art

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

Taking into account the above mobility management and security issues, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", RFC3775, IETF, 2004) have been introduced. Together these specifications are planned to provide mobility support for the next generation Internet. Security work is developing in the form of IPsec, and related activities, such as various key exchange protocols, with the aim being to provide security in the IP layer. However, experience has shown that it is fairly hard to reach combined security and mobility using the current standards.

An IP address describes a topological location of a node in the network. The IP address is used to route the packet from the source node to the destination. At the same time the IP address is also used to identify the node, providing two different functions in one entity. This is akin to a person responding with their home address when asked who they are. When mobility is also considered, the situation becomes even more complicated: since IP addresses act as host identifiers in this scheme, they must not be changed; however, since IP addresses also describe topological locations, they must necessarily change when a host changes its location in the network. Clearly, it is impossible to achieve both stability and dynamic changes at the same time.

One solution to the problem is to separate the identification and location functions from each other, and this is the approach taken in the Host Identity Protocol (HIP) proposal (R. Moskowitz, P. Nikander, P. Jokela, "Host Identity Protocol", Internet Draft, work in progress, draft-ietf-hip-base-02, IETF, 2005). HIP separates the location and identity roles of IP addresses by introducing a new name-space, the Host Identity (HI). In HIP, the Host Identity is basically a public cryptographic key of a public-private key-pair, and is generated from and linked to the private key. The public key identifies the party that holds the only copy of the private key. A host possessing the private key of the key-pair can directly prove that it "owns" the public key that is used to identify it in the network. The separation also provides a means to handle mobility and multi-homing in a secure way.

HIP is discussed in more detail below, but is not the only proposal based around the idea of location and identity separation. FARA (D. Clark, R. Braden, A. Falk, V. Pingali, "FARA: Reorganizing the Addressing Architecture", ACM SIGCOMM 2003 Workshops, Aug. 25 & 27, 2003) is a generalized model of ideas that provides a framework from which the actual architecture can be derived. FARA could make use of the HIP when the node identifications are verified, and consequently HIP could be a part of a particular FARA instantiation. The PeerNet proposal (J. Eriksson, M. Faloutsos, S. Krishnamurthy, "PeerNet: Pushing Peer-to-Peer Down the Stack", IPTPS '03, Feb. 20-21, 2003) also discusses the location and identity separation. The Internet Indirection Infrastructure, $I^3$ (I. Stoica, et. al., "Internet Indirection Infrastructure", ACM SIGCOMM '02, Aug. 19-23, 2002) also defines a separation between the identity and routing information.

The Host Identity Protocol introduces a separation between the location and identity information at the IP layer. In addition to the separation, a protocol is defined to negotiate security associations (SAs) between HIP-enabled nodes.

With HIP, each host has one or more identities, which can be long-term or short-term, that can be used to identify it in the network. With HIP, an identifier is the public key of a public-private key pair. When the host possesses the private key, it can prove that it actually "owns" this identity that the public key represents; this is akin to showing an ID-card.

The HIP Host Identity (HI), being a public key, can be quite long and is therefore not practical in all situations. In HIP, the HI is represented with a 128-bit long Host Identity Tag (HIT) that is generated from the HI by hashing it; there is accordingly a slight collision risk whereby two HIs are hashed to the same HIT. Thus, the HIT identifies a HI. Since the HIT is 128 bits long, it can be used for IPv6 applications directly as it is exactly the same length as IPv6 addresses.

Another representation of the Host Identities is the Local Scope Identifier (LSI), which is a 32-bit representation for the Host Identity. The purpose of the LSI is to facilitate using Host Identities in existing protocols and APIs. For example, since the LSI is the same length as an IPv4 address, it can be used for IPv4 applications directly. Although much of the remainder of this description will be based around the use of the longer HIT, it will be appreciated that the same or similar considerations apply to the alternative LSI representation.

When HIP is used, the upper layers, including the applications, no longer see the IP address. Instead, they see the HIT as the "address" of the destination host. The location information is hidden at a new layer, to be described below. The IP addresses no longer identify the nodes; they are only used for routing the packets in the network. Applications are not typically interested in location information but do need to know the identity of their peers. The identity is represented by the HIT. This means that the IP address only has importance on lower layers where routing is concerned. The HITs, which the applications use, must be mapped to the corresponding IP addresses before any packets leave the host. This is achieved in a new Host Identity Layer as described below.

FIG. 1 of the accompanying drawings illustrates the various layers in HIP, comprising the standard transport layer 4, network layer 8 and link layer 10, with an application or process 2 communicating with the transport layer 4 below it. With HIP, a new Host Identity Layer 6 is disposed between the transport layer 4 and the network layer 8.

Locally, each HI and its associated HIT are mapped to the IP addresses of the node. When packets are leaving the host, the correct route is chosen (by whatever means) and corresponding IP addresses are put into the packet as the source and destination addresses. Each packet arriving from the upper layer contains the HIT of the peer as the destination address. The mapping between the HIT and the location information can be found at the HI layer 6. Hence, the destination address is converted to the mapped IP address, and the source HIT is converted to source IP address.

HIP defines a base message exchange containing four messages, a four-way handshake, and this is used to create a security association (SA) between HIP-enabled hosts. During the message exchange, the Diffie-Hellman procedure is used to create a session key and to establish a pair of IPsec Encapsulating Security Payload (ESP) Security Associations (SAs) between the nodes.

FIG. 2 of the accompanying drawings illustrates the operation of the four-way handshake. The negotiating parties are referred to as the Initiator, starting the connection, and the Responder. The Initiator begins the negotiation by sending an I1 packet that contains the HITs of the nodes participating in the negotiation. The destination HIT may also be zeroed, if the Responder's HIT is not known by the Initiator.

When the Responder gets the I1 packet, it sends back an R1 packet that contains a puzzle to be solved by the Initiator. The protocol is designed so that the Initiator must do most of the calculation during the puzzle solving. This gives some protection against Denial of Service (DoS) attacks. The R1 packet also contains the HITs of the nodes participating in the negotiation. In addition, the R1 packet initiates the Diffie-Hellman procedure, containing the Host Identity public key $PK_R$ of the Responder together with Diffie-Helhman parameters including the public Diffie-Hellman key $DH_R$ of the Responder.

Once the R1 packet is received, the Initiator solves the puzzle and sends a response in an I2 packet including the solution together with an IPsec SPI value and its Host Identity public key $PK_I$, encrypted using a session key constructed with the Responder's public Diffie-Helhnan key $DH_R$ just received, to the Responder (although encryption of the Host Identity public key $PK_I$ is becoming optional in the standard HIP protocol). The I2 packet also contains the HITs of the nodes participating in the negotiation, and the Diffie-Hellman key $DH_I$ of the Initiator. The Responder verifies that the puzzle has been solved, authenticates that the sender of the message is the Initiator by verifying that the message signature has been created by the private key corresponding to the Initiator's Host Identity public key $PK_I$, and creates the IPsec ESP SAs. The final R2 message contains the SPI value of the Responder, and the HITs of the nodes participating in the negotiation. It is appreciated that creating the IPsec ESP SAs is becoming optional in the standard HIP base exchange.

In addition to the I1, R1, I2, and R2 packets, the HIP specification defines other packets, including the UPDATE packet. While there is an active HIP association between two communicating HIP-enabled hosts, the UPDATE packet can be used to update the shared state; for example, the UPDATE packet is used to update ESP Security Associations. There are extensions to the HIP base specification, for example, the HIP Mobility and Multi-homing protocol (P. Nikander, J. Arkko, P. Jokela, "End-Host Mobility and Multihoming with Host Identity Protocol", Internet Draft, work in progress, draft-ietf-hip-mm-01, IETF, 2005), that use the UPDATE packets for various purposes. It is noted that a HIP host ignores and drops UPDATE packets if it does not have any active HIP association with the sender of the UPDATE packet.

The SAs between the hosts are bound to the Host Identities, represented by the HITs. However, the data packets travelling in the network do not contain the actual HI information, but the arriving packet is identified and mapped to the correct SA using the Security Parameter Index (SPI) value in the IPsec header. FIG. 3 of the accompanying drawings shows the logical and actual packet structures when it travels in the network.

From the above it is clear that changing the location information in the packet does not create any problems for the IPsec processing. The packet is still correctly identified using the SPI. If, for some reason, the packet is routed to a wrong destination, the receiver is not able to open the packet as it does not have the correct key.

When an outgoing packet arrives at the HI layer from the above layer, the destination HIT is verified from the IPsec SADB. If an SA matching to the destination HIT is found, the packet is encrypted using the session key associated with the SA.

The HIT cannot be used to route the packet. Thus, the destination (and source) addresses must be changed to match the IP addresses of the nodes. These mappings are stored, as mentioned earlier, in the HI layer. After the addresses have been changed, the packet can be sent to the network where it is routed to the destination using the IP address information.

At the receiving host, the SPI value is used to find the correct SA form the IPsec SADB. If an entry is found, the IP addresses can be changed to corresponding HITs and the packet can be decrypted using the session key.

With HIP, the separation between the location and identity information makes it clear that the packet identification and routing can be cleanly separated from each other. The host receiving a packet identifies the sender by first getting the correct key and then decrypting the packet. Thus, the IP addresses that are in the packet are irrelevant.

Other technical considerations arise when implementing HIP in third generation (3G) mobile telecommunications networks where not all of the User Equipments (UEs) in the 3G environment are HIP enabled. In this context, the Universal Mobile Telecommunications System (UMTS) is the 3G successor to the Global System for Mobile Communications (GSM). The most important evolutionary step of GSM towards UMTS is the General Packet Radio Service (GPRS). GPRS introduces packet switching into the GSM core network and allows direct access to packet data networks (PDNs). This enables high-data rate packet switched transmission well beyond the 64 kbps limit of ISDN through the GSM core network, which is a necessity for UMTS data transmission rates of up to 2 Mbps. GPRS is a prerequisite for the UMTS introduction. Similar principles are equally applicable to UMTS as they are to GPRS. GPRS has been designed as an extension to the existing GSM network infrastructure, with the aim of providing a connectionless packet data service. GPRS introduces a number of new functional elements over GSM that support the end-to-end transport of IP-based packet data.

As mentioned above, the full base exchange protocol is a four-message two-round-trip protocol. The Hi3 proposal (Internet Draft, work in progress, draft-nikander-hiprg-hi3-00.txt] makes a proposal to reduce one round trip at the Responder end by storing the pre-computed R1 messages into a middle box and letting the middle box reply to I1 messages directly, thereby reducing the messages that the Responder sees to I2 and R2, i.e. two messages and one round trip. However, this solution does not change the situation at the Initiator end.

Considering a wireless HIP base exchange Initiator, the two round trips in the full HIP base exchange protocol can create a performance problem. Requiring the Initiator to wait for two round trips before it can communicate with the Responder forms a potential performance bottleneck. It would be desirable to reduce the number of required messages and thereby reduce the session setup latency.

BRIEF SUMMARY OF THE INVENTION

According to a first aspect of the present invention there is provided a modified Host Identity Protocol, HIP, base exchange method for use by first and second HIP hosts having a shared state from a pre-existing relationship, comprising: sending an authentication message from the first host to the second host comprising an identifier of the first host and a cryptographic item; and receiving the authentication message at the second host and using the identifier and information relating to the shared state to authenticate the cryptographic item.

The identifier may be a HIP identity tag. The HIP identity tag may be a Host Identity Tag (HIT) or a Local Scope Identifier (LSI).

Authenticating the cryptographic item may comprise verifying the origin of the cryptographic item.

The method may comprise retrieving the shared stated information using the received identifier.

The method may comprise generating or selecting the cryptographic item using the shared state information.

The cryptographic item may derive from the performance of a cryptographic function. The cryptographic function may have at least the identifier as input. The cryptographic function may be a hash function.

The shared state information may comprise at least the last used item from a hash chain generated from the hash function, and comprising selecting the next unused item in the hash chain for use as the cryptographic item.

The cryptographic item may be authenticated by computing the hash function using the received identifier and the received cryptographic item, and comparing the result with at least the last used item.

The hash chain may be pre-generated and at least the unused items in the hash chain stored at or accessible by the first host.

The hash chain may be generated as a result of the pre-existing relationship. The hash chain may be dedicated for interactions between the first and second hosts.

The hash chain may be dedicated for interactions between the first hosts and a plurality of such second hosts.

The shared state information may comprise secret information exchanged between the first and second hosts as a result of the pre-existing relationship.

The secret information may comprise a cryptographic key.

The secret information may be used as input to the cryptographic function.

The cryptographic item may be authenticated by computing the cryptographic function using the received identifier and the secret information, and comparing the result with the received cryptographic item.

A time stamp may be used as input to the cryptographic function.

A counter may be used as input to the cryptographic function, and the method may comprise incrementing the counter.

The authentication message may comprise the time stamp and/or counter, and the cryptographic item is authenticated by computing the cryptographic function using the received time stamp and/or counter, and comparing the result with the received cryptographic item.

The shared stated information may be stored at the second host.

The method may comprise retrieving the shared state information from a remote server.

The shared state information stored in the remote server may be protected against modification by unauthorised parties.

The method may comprise forwarding at least part of the authentication message to the remote server for retrieving the shared state information.

The authentication message may comprise the first host's public Diffie-Hellmann key.

The authentication message may comprise the first host's Host Identity public key.

The method may comprise, if authentication of the cryptographic item is successful, sending a confirmation message from the second host to the first host that indicates successful authentication.

The confirmation message may comprise the second host's public Diffie-Hellman key.

The method may comprise signing the confirmation message with the second host's private key.

The method may comprise verifying the signature at the first host using the second host's Host Identity public key.

The second host's Host Identity public key may be known to the first host as a result of the pre-existing relationship or may be available from a remote server.

The method may comprise creating a HIP Security Association between the first and second hosts following receipt of the confirmation message at the first host.

The pre-existing relationship may derive from having previously performed a standard HIP base exchange procedure between the first and second hosts.

The method may comprise determining whether or not the authentication message is a standard HIP base exchange I2 message.

The method may comprise differentiating the authentication message from a standard HIP base exchange I2 message by detecting a HIP parameter associated with the cryptographic item.

The method may comprise differentiating the authentication message from a standard HIP base exchange I2 message with reference to any one or more of: the HIP packet type; the HIP protocol version field; a bit or some bit combination from the HIP header reserved field; a HIP control in the header Controls field; a variant in either or both of the identifiers of the first and second hosts; and the IP protocol used.

According to a second aspect of the present invention there is provided a communications system for performing a modified Host Identity Protocol, HIP, base exchange method between first and second HIP hosts of the system having a shared state from a pre-existing relationship: the first host comprising means for sending an authentication message to the second host comprising an identifier of the first host and a cryptographic item; and the second host comprising means for receiving the authentication message and using the identifier and information relating to the shared state to authenticate the cryptographic item.

According to a third aspect of the present invention there is provided a modified Host Identity Protocol, HIP, base exchange method for use by a HIP Initiator host having a shared state from a pre-existing relationship with a HIP Responder host, comprising sending an authentication message to the HIP Responder host comprising an identifier of the HIP Initiator host and a cryptographic item, the authentication message being for use at the HIP Responder host to authenticate the cryptographic item using the identifier and information relating to the shared state.

According to a fourth aspect of the present invention there is provided an apparatus for performing, as a Host Identity Protocol, HIP, Initiator host, a modified HIP base exchange method with a HIP Responder host with which the HIP Initiator host has a shared state from a pre-existing relationship, comprising means for sending an authentication message to the HIP Responder host comprising an identifier of the HIP Initiator host and a cryptographic item, the authentication message being for use at the HIP Responder host to authenticate the cryptographic item using the identifier and information relating to the shared state.

According to a fifth aspect of the present invention there is provided a modified Host Identity Protocol, HIP, base exchange method for use by a HIP Responder host having a shared state from a pre-existing relationship with a HIP Initiator host, comprising receiving from the HIP Initiator host an authentication message comprising an identifier of the HIP Initiator host and a cryptographic item, and using the identifier and information relating to the shared state to authenticate the cryptographic item.

According to a sixth aspect of the present invention there is provided an apparatus for performing, as a Host Identity Protocol, HIP, Responder host, a modified HIP base exchange method with a HIP Initiator host with which the HIP Responder host has a shared state from a pre-existing relationship, comprising means for receiving from the HIP Initiator host an authentication message comprising an identifier of the HIP Initiator host and a cryptographic item, and using the identifier and information relating to the shared state to authenticate the cryptographic item.

According to a seventh aspect of the present invention there is provided an operating program which, when run on an apparatus, causes the apparatus to carry out a method according to the third or fifth aspect of the present invention.

According to an eighth aspect of the present invention there is provided an operating program which, when loaded into an apparatus, causes the apparatus to become apparatus according to the fourth or sixth aspect of the present invention. The operating program may be carried on a carrier medium. The carrier medium may be a transmission medium. The carrier medium may be a storage medium.

As discussed above, the present applicants have identified the desirability of reducing the number of required messages in the HIP base exchange procedure, where possible. The present applicants have determined that there is some potential for removing the initial message exchange, i.e., messages I1 and R1, as will now be explained.

The I1 is essentially a trigger message asking for a fresh R1 message. The R1 message itself provides three distinct functions:

Firstly, to provide the Initiator with the Host Identity public key $PK_R$ of the Responder Secondly, to provide the Initiator with the puzzle so that the Initiator can show its "honesty" to the Responder by solving the puzzle.

Thirdly, to provide protection against pre-computation and replay attacks by supplying the Initiator with a puzzle that the Responder can verify to be freshly generated and not one created a long time ago.

In the case where the Initiator and the Responder do not have any pre-existing relationship, there is little opportunity for improvement; the Initiator must receive a fresh R1 message so that it can show its "honesty" and freshness of the exchange to the Responder.

However, if there is a pre-existing relationship between the Initiator and the Responder, then there is the potential for improvement, and this is the approach adopted in an embodiment of the present invention.

Figure 1:
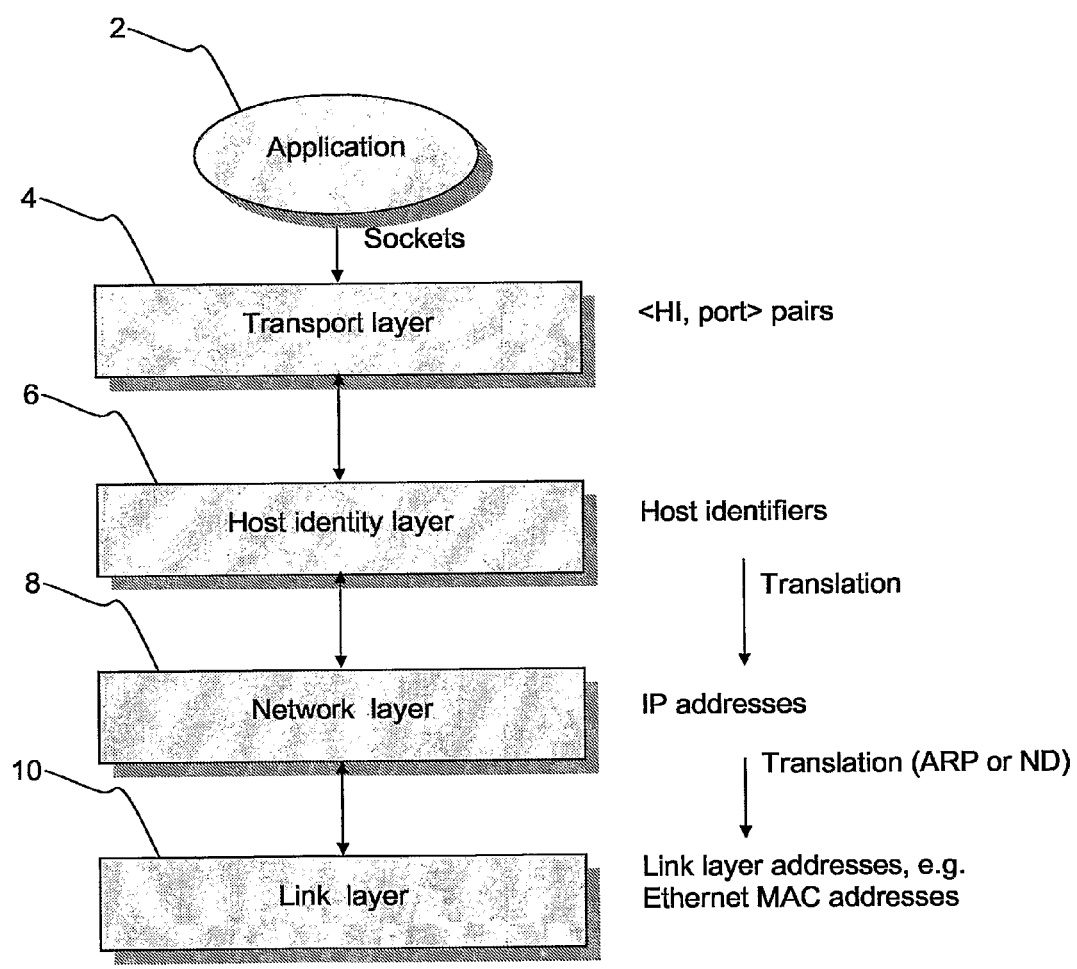
FIG. 1, discussed hereinbefore, illustrates the various layers in the Host Identity Protocol.
Figure 2:
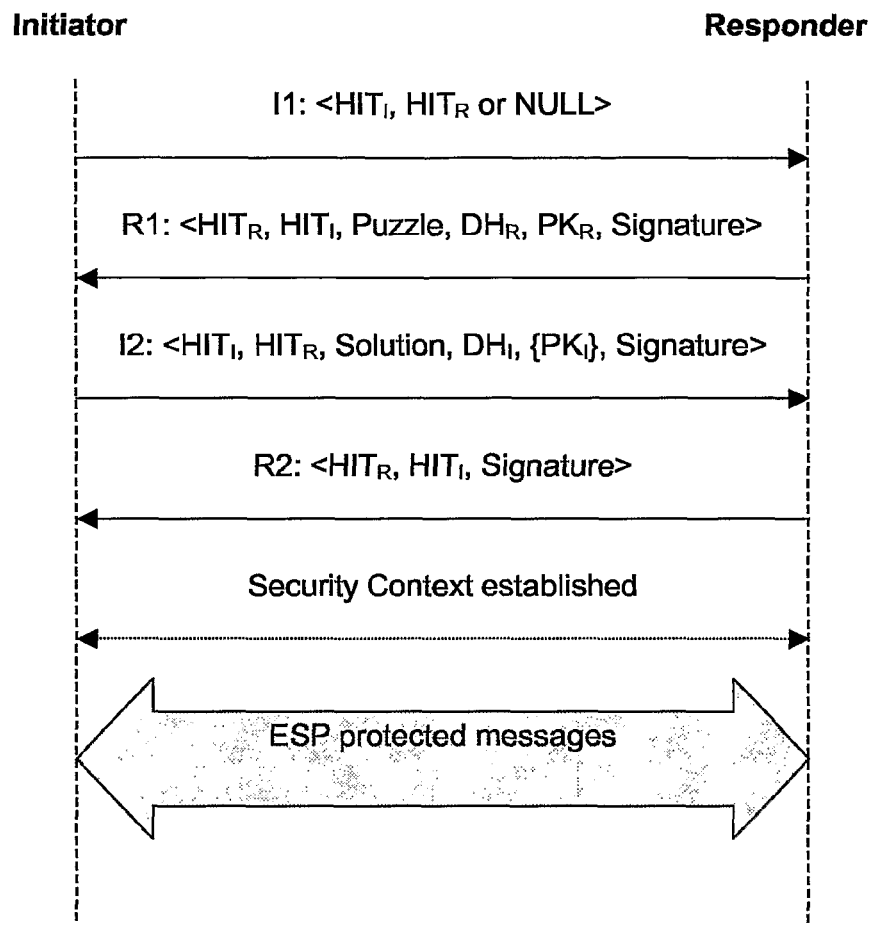
FIG. 2, also discussed hereinbefore, illustrates the operation of the four-way handshake in the HIP protocol.
Figure 3:
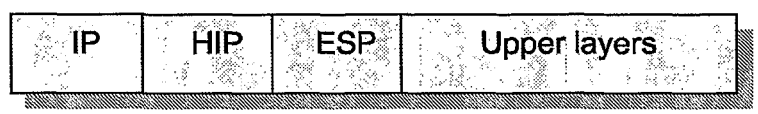
FIG. 3, also discussed hereinbefore, shows the logical and actual packet structures in HIP.
Figure 3:
Figure 4:
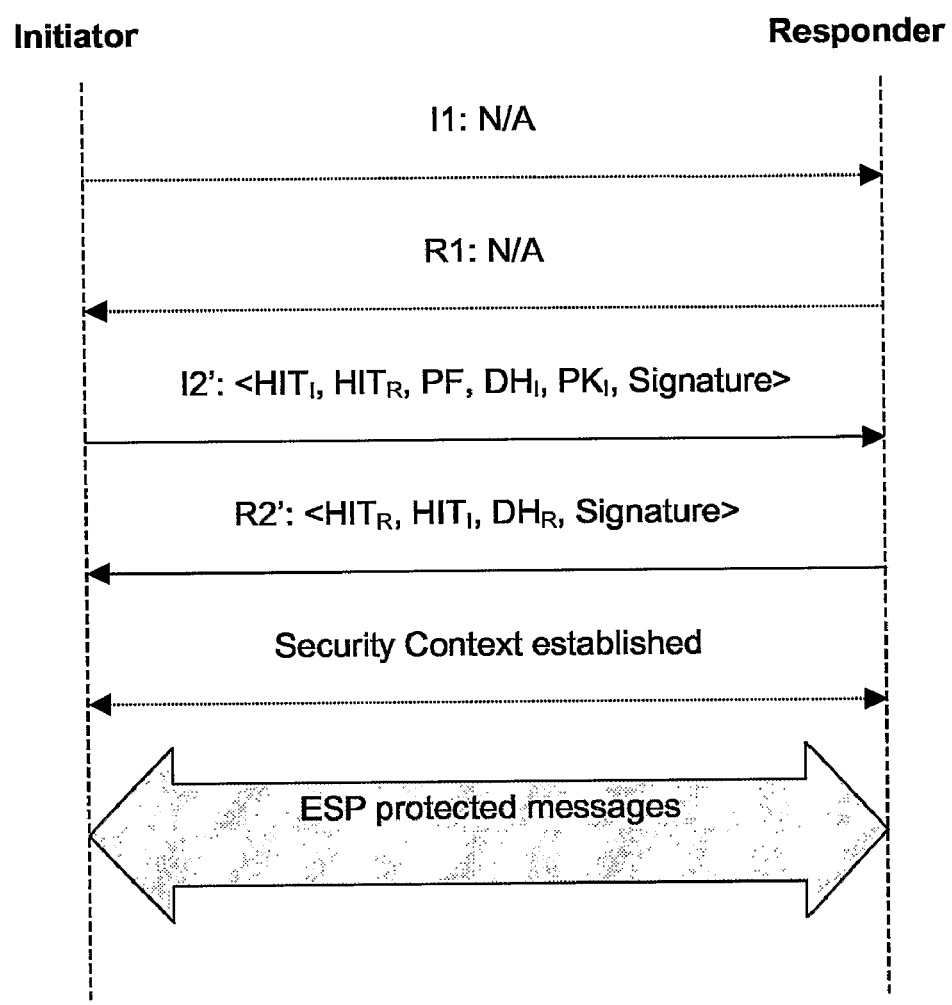
FIG. 4 illustrates in overview a modified HIP base exchange method embodying the present invention.

FIG. 4 is an overview diagram illustrating a modified HIP base exchange method according to an embodiment of the present invention. From a comparison between FIGS. 2 and 4, it can be seen that this method embodying the present invention corresponds closely to the standard HIP base exchange method, but the I1 and R1 steps of the standard HIP base exchange method are not performed in this embodiment of the present invention. Also, the puzzle solution in the I2 message is replaced with a new HP parameter, herein called Paired Freshness (PF), that contains a fresh cryptographic item. The origin of the cryptographic item is verified by the Responder using information relating to a shared state resulting from the pre-existing relationship between the Initiator and the Responder. The exact form of the cryptographic item and the shared state information varies, as will now be explained with reference to particular embodiments of the present invention. Furthermore, note that the shared state may be asymmetric in the sense that the Initiator and Responder may hold different pieces of information and the relationship between the pieces of information may be cryptographic.

Figure 5:
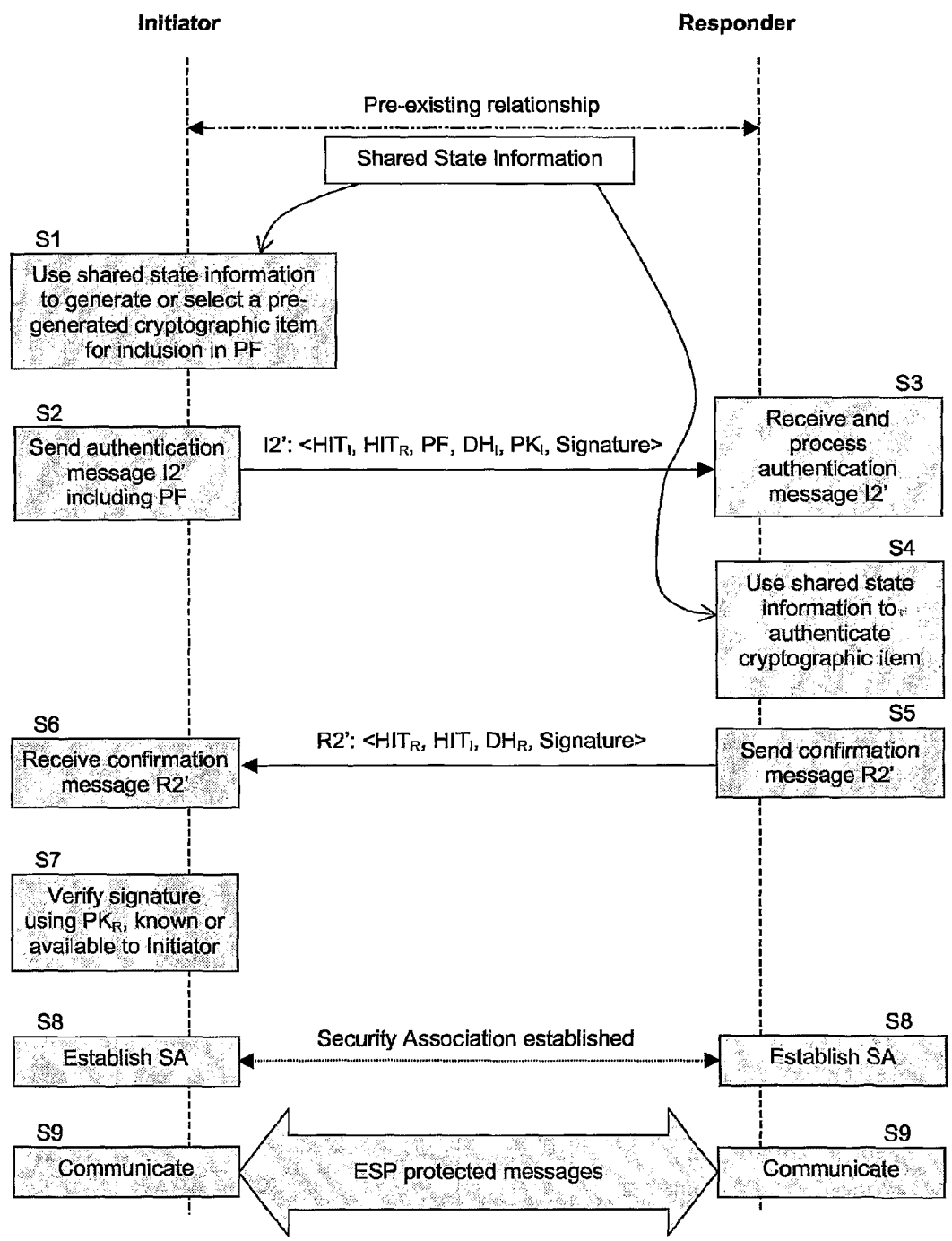
FIG. 5 illustrates in more detail a modified HIP base exchange method embodying the present invention.

FIG. 5 corresponds to FIG. 4, but shows in more detail the steps performed in an embodiment of the present invention and the messages exchanged between the Initiator and the Responder hosts. The first embodiment of the present invention will be described with reference to FIG. 5. Each of the steps S1 to S9 shown in FIG. 5 is performed by a corresponding part of the host performing that step, and therefore FIG. 5 can also be interpreted as showing the structure of the hosts; in practice, a physical element of the host can perform more than one of the steps.

In the first embodiment of the present invention, the above-mentioned cryptographic item and shared state information relate to a hash chain maintained at the Initiator. The Initiator knows a number of unused values in the hash chain, and the Responder knows at least the last used value from the hash chain. In the first embodiment, the shared state information comprises at least the last used value from the hash chain.

Hash chains are based on a public function that is relatively easy to compute but computationally very difficult or impossible to invert. Such functions are called one-way functions. If the output of a one-way function is of fixed length, it is referred to as a one-way hash function. In other words, a function hash( ) that maps bit strings, either of an arbitrary length or a predetermined length, to strings of a fixed length is a one-way hash function if it satisfies three properties: (a) given x, it is easy to compute hash(x); (b) given hash(x), it is hard to compute x; and (c) it is hard to find two values x and y such that hash(x)=hash(y), where x≠y. More information can be found in T. A. Berson, L. Gong and T. M. A. Lomas, Secure, "Keyed, and Collisionful Hash Functions, Technical Report" SRI-CSL-94-08, SRI International, May 1994.

A hash chain is related to this, and is described, for example, in L. Lamport, "Password Authentication with Insecure Communication", Communications of the ACM 24.11 (November 1981), pp 770-772. A hash chain of length N is constructed by applying a one-way hash function hash( ) recursively to an initial seed value s: $hash^N(s)$=hash(hash (hash( ... hash(s) ... ))) (N times). For a hash chain generated in the reverse order, each item $H_i$ in the hash chain is generated from previously-generated item $H_{i+1}$ by computing $H_i$=hash($H_{i+1}$).

The first element $H_0$ of the hash chain resembles the public key in public key cryptography. By knowing $H_0$, $H_1$ cannot be generated by those who do not know the value s, however given $H_1$, its correctness can be verified using $H_0$. In a typical hash chain application, $H_0$ would be securely distributed and then the elements of the hash chain would be spent (or used) one by one by starting from $H_1$ and continuing until the value of s is reached. At this point the hash chain is said to be exhausted, and the whole process is repeated again with a different s to reinitialize the system. Other variations of hash chains are disclosed elsewhere.

In the first embodiment, such a hash chain is established at the Initiator as a result of a previous interaction between the Initiator and the Responder. The hash chain may be particular to the particular Initiator-Responder pair, with a different one established for each Responder host, or may relate to interactions with a number of different Responder hosts with which the Initiator communicates.

The previous interaction may, for example, be the performance of the standard HIP base exchange between the two hosts to set up a secure HIP communications session, but need not be. Any form of pre-existing relationship between the Initiator and the Responder that establishes a shared state between the two hosts can be used. The pre-existing relationship and shared state information is illustrated schematically at the top of FIG. 5.

The shared state between the Initiator and the Responder in the first embodiment comprises some mutual knowledge relating to the current position in the hash chain established at the Initiator. In particular, the shared state information comprises information identifying the last used item in the hash chain. The shared state information is known both to the Initiator and the Responder. For example, the shared state information may be stored both in the Initiator and the Responder.

In this embodiment, the hash chain is constructed using with hash function having both the previous hash chain item and the Initiator's Host Identity Tag, HIT, as input:

$$H_i = \text{hash}(HIT_I, H_{i+1}).$$

Examples of such hash functions include MD5, SHA-1 and SHA-256. HIP currently uses SHA-1 for other purposes, and hence this would be one possible choice for use in the first embodiment of the present invention. The hash function hash( ) is known to both the Initiator and the Responder.

Suppose the Initiator wishes to establish a fresh secure HIP connection between itself and the Responder by performing a HIP base exchange operation. Because of the pre-existing relationship, in the first embodiment a modified HIP base exchange method is instead performed in which the standard HIP base exchange messages I1 and R1 are dispensed with.

Instead, referring to FIG. 5, in step S1 a pre-generated cryptographic item is selected for inclusion in a Paired Freshness (PF) field of an authentication message I2', based on the shared state information. In the first embodiment, this cryptographic item is the next unused item in the hash chain, the shared state information revealing which item in the hash chain was last used. Therefore, PF is chosen to comprise the cryptographic item $H_i$, such that $H_{i-1} = \text{hash}(HIT_I, H_i)$, where $H_{i-1}$ is the previous mutually known value from the hash chain (the shared state information).

In step S2, an authentication message I2' comprising PF, and also comprising the Host Identity Tag $HIT_I$ of the Initiator, is sent to the Responder, which is received in step S3 by the Responder. The I2' message also contains the Initiator's public Diffie-Helhnan key $DH_I$ and Host Identity public key $PK_I$. (While the standard HIP base exchange protocol requires the I2 message to carry the Initiator's Host Identity public key $PK_I$, in other embodiments of this invention the key may be left out from the I2' message due to the Responder either knowing the key $PK_I$ as a part of the shared state or being able to fetch it from a public server.)

In the first embodiment, the I2' message is of the same packet type as an I2 message in the standard HIP base exchange method. So, when the Responder receives the I2' message in step S3, it would normally expect to find a puzzle solution in the message and subsequently to verify the puzzle solution. However, in the modified HIP base exchange method of the first embodiment, if the Responder does not find a puzzle solution but instead finds a Paired Freshness parameter, it is able to determine that the modified rather than the standard HIP base exchange is being employed. Note that in the case of the standard HIP base exchange the Responder does not typically create any state when responding to an I1 message with an R1 message, and therefore handles all I2 messages as if they were arriving without any recent prior communication between the hosts.

In step S3, therefore, the Responder scans the received message, looking for the puzzle solution parameter. If the message is an I2 message from the standard protocol, the Responder will find a Solution parameter, and it will continue to process the message according to the standard protocol. However, if the Initiator is using the modified protocol according to an embodiment of the present invention, the Responder will find and extract a Peer Freshness parameter PF. The Responder also extracts the Initiator's Host Identity Tag HIT from the HIP header.

Using $HIT_I$, the Responder makes a lookup to a local database, looking for a shared state associated with $HIT_I$. The shared state information in this embodiment is the current hash chain value $H_{i-1}$. If no such shared state is found, the I2' message is dropped and the Responder may optionally reply with an ICMP Parameter Error message. If a state related to $HIT_I$ is found, the Responder continues to step S4.

Using the cryptographic item $H_i$ from the Paired Freshness parameter, the $H_{i-1}$ value from the local state, and the Initiator's Host Identity Tag $HIT_I$, in step S4, the Responder authenticates the cryptographic item by verifying that $H_{i-1} = \text{hash}(HIT_I, H_i)$. If this relationship does not hold, the I2' message is dropped and an optional ICMP Parameter Error may be sent.

Authenticating the cryptographic item essentially comprises verifying the origin of the cryptographic item. By verifying the origin of the cryptographic item, the verifier is able to gain sufficient assurance, for further processing of the received message, that the cryptographic item was sent by the originator after either (a) the shared state was set up between the originator and verifier; or (b) after the originator successfully last sent a cryptographic item to the verifier, whichever is later, or within the bounds of the time stamp, if time stamps are used (this is described further below).

To provide robustness in the case where the Initiator sends one or more I2' messages that never reach the Responder, if the immediate verification above does not match, the Responder may compute a small number of hash chain values preceeding $H_{i-1}$ by applying the hash function repeatedly and thereby generating other candidates for matching against the previously used local state. That is, instead of requiring that the local state contains $H_{i-1}$, the Responder may allow it to contain $H_{i-2}, \ldots, H_{i-k}$ instead, for some small value of k. Even though this method would otherwise also work for larger values of k, thereby providing better robustness against lost packets, the desire to protect the Responder from CPU-exhausting Denial-of-Service attacks requires one to limit k to a small value, thereby creating an upper bound to the amount of CPU cycles that the Responder will use in verifying the cryptographic item in any one I2' message. Furthermore, if the Initiator knows a lower bound for k, in the event of sending I2' messages repeatedly without receiving any R2 message, the Initiator can deem that the Responder has not apparently received the I2' messages and that the shared state has therefore become stale. As a repercussion of the event the Initiator can revert back to using the standard HIP base exchange.

On the other hand, if the authentication is successful, the Responder knows that the I2' message was recently sent by a known and verified Initiator. In response, the Responder updates the shared state by storing the newly used hash chain value $H_i$ as the last used hash chain item, and to a large extent proceeds to process the I2' message according to the standard HIP base exchange protocol, considering the puzzle solution to be correctly verified and authenticating the I2' message by verifying the digital signature in the message.

Following positive authentication in step S4, in step S5 a confirmation message R2' is sent to the Initiator. The R2' message contains the Responder's public Diffie-Helhman key, so that the Initiator can create the shared key material. Other than that, the R2' message can be the same as for the standard protocol.

The confirmation message R2' is received by the Initiator in step S6, and in step S7 the Initiator verifies the signature used by the Responder for the R2' message. The Initiator will already have the Responder's Host Identity public key $PK_R$ in storage for this purpose from the pre-existing relationship. Alternatively, instead of knowing the Responder's Host Identity public key $PK_R$, the Initiator may fetch it from a public storage; if the Initiator knows the Responder's $HIT_R$, the Host Identity public keys in the storage need not be integrity protected (but they may be). Or $PK_R$ could be sent in the R2' message.

Following positive verification in step S7, in step S8 the HIP Security Associations are established, and secure HIP communications conducted in step S9.

Although it is described above that the Responder knows (e.g. has in storage) the last used value of the hash chain (the shared state information), the Responder may instead fetch this information from a public storage, which is integrity-protected. Fetching information relating to the hash chain from a public storage in this manner may pose a Denial-of-Service risk as it requires resources and mandates a temporary state at the Responder; i.e., the Responder must remember that it is processing the I2' message until it receives the hash value or an indication that there is no hash value associated with the Initiator's $HIT_I$. Alternatively, if the Responder passes the I2' message to the public storage along with the query and get it back with the reply, this problem may be partially avoided.

Likewise, the hash chain need not be stored and maintained at the Initiator. It can be stored and maintained anywhere, provided the Initiator has access to the unused values in the hash chain and the unused values in the hash chain are not available publicly.

In the first embodiment described above, the shared state information and the cryptographic item related to a hash chain. The shared state information comprised the last used item from the hash chain and the cryptographic item comprised the next unused item from the hash chain.

Instead of using a hash chain, second and third embodiments of the present invention are based on the use of a shared secret between the Initiator and the Responder. The second and third embodiments are similar to each other, and are both closely related to the first embodiment. The second and third embodiments follow the same steps illustrated in FIG. 5, with the form of the cryptographic item and the shared state information being different to the first embodiment. Accordingly, a full description of the second and third embodiments of the present invention is not necessary; instead the main differences compared to the first embodiment will be highlighted.

In the second embodiment, the PF parameter created in step S1 is based on a shared secret and a synchronized counter value, as follows:

$$PF=[\text{hash}(HIT_I,K_{IR},\text{counter}),\text{counter}],$$

where $K_{IR}$ is the shared secret, "counter" is the value of a counter variable that is incremented after each use, $HIT_I$, is the Host Identity Tag of the Initiator, and hash( ) is any suitable hash function. The hash function hash( ) takes three inputs $HIT_I$, $K_{IR}$, and "counter" to generate a cryptographic item having a value hash($HIT_I$, $K_{IR}$, counter), for inclusion in the PF parameter along with the counter value used to generate the cryptographic item. The shared secret $K_{IR}$ is known only to the Initiator and the Responder or a group of mutually-trusting Responders, and is shared between the two hosts (or the Initiator and the group of Responders) as a result of the pre-existing relationship.

The PF parameter is sent, received and extracted in steps S2 and S3 as described above in connection with the first embodiment. In this embodiment, however, when the Responder makes a lookup to a local database using $HIT_I$ to look for a shared state associated with $HIT_I$, the shared state information that is retrieved is the shared secret $K_{IR}$ and the last used counter value. The Responder also extracts the "counter" value from the PF parameter to recover from a case where one or more I2' messages have been sent by the Initiator but never reach the Responder. As before, if a state related to $HIT_1$ is found, the Responder continues to step S4. As a difference to the first embodiment, the difference between the counter value stored at the Responder and the one used by the Initiator can be considerably larger than the parameter k in the first embodiment, due to the counter parameter being a direct input to the hash function and not involving repeated application of the hash function as in the first embodiment.

In step S4, the Responder verifies the origin of the cryptographic item from the received PF parameter by computing the hash function, using as inputs the following items: $HIT_I$ from the I2' header, the "counter" value from the PF parameter, and $K_{IR}$ from the local state look-up. Before computing the hash, the Responder verifies that the counter value received in the PF parameter is larger or equal to the value stored in the shared state. The hash function computed is hash($HIT_I$, $K_{IR}$, counter), which is equivalent to that computed by the Initiator to generate the cryptographic item initially. If the verification is successful, the Responder knows that the shared secret has been used correctly and recently, and that the I2' message was recently sent by a known and verified Initiator. The Responder stores the counter value to the shared state. Processing then continues as described above in connection with the first embodiment.

The third embodiment of the present invention is very similar to the second embodiment, also using a shared secret. The third embodiment differs from the second embodiment in that instead of a counter value, a current time value is used, with the Initiator and Responder preferably having at least roughly synchronized clocks. Thus the PF parameter in the third embodiment is created according to the following:

$$PF=[\text{hash}(HIT_I,K_{IR},\text{current time}),\text{current time}].$$

In the first to third embodiments, the cryptographic item may be generated using any other input values known to both hosts, for example such as the Host Identity Tag of the Responder, $HIT_R$. However, in the first embodiment it may only contain fixed input values that are known at the time the hash chain is originally created by the Initiator, while in the second and third embodiments it may also contain input values that are determined at the time of execution. In the second and third embodiments, the hash function hash( ) can be replaced by any other type of encryption function where the parties share a secret instead of using a hash chain. It is not essential to use the Host Identity Tag of the Initiator, $HIT_I$, as input to the cryptographic function used to generate the cryptographic item.

Although the embodiments are described above with the Initiator communicating with a single Responder, and there being a single hash chain for such communications, there could be a group of Responder hosts, instead of just a single one, all using the same public directory to store the last used hash chain value. In that case, the Initiator could use just a single hash chain for creating HIP associations towards all hosts in the group instead of having a separate hash chain for all the hosts in the group.

The use of hash chain and a shared secret can also be combined, and the methods outlined above may be made more or less complex by various means readily apparent to the skilled person without substantially affecting their security properties.

In step S3 of the first to third embodiments, the database or directory lookup should preferably not take too much resources or too long a time, or else the Responder would become vulnerable to a new Denial-of-Service attack. However, as long as the effort and time required is reasonable, e.g., taking at most a few times as much resources and times as verifying the puzzle solution in the standard HIP base exchange protocol, a modified base exchange procedure can be considered to be sufficiently secure.

While the PF parameter type may be recognised by any suitable means, it is expected that the Peer Freshness parameter type would be defined as a separate HIP extension parameter, and that it would have a separate parameter type identifier. In this respect, the HIP protocol currently uses 16-bit unsigned integers as parameter identifiers, and each parameter type is given a unique parameter type identifier.

Other suitable alternatives for determining whether the standard or the modified version of the HIP base exchange protocol is being used include the HIP packet type (using a different type from the standard I2 packet), the HIP version number, the Reserved field in the HIP header, the HIP control bits (Controls), encoding the information in either the Initiator or the Responder HIT, e.g. by having a different prefix from the one used in the standard protocol, and using a different IP protocol type to carry messages of the modified protocol version.

In an embodiment of the present invention, the Initiator's Host Identity public key $PK_I$ in the I2' message may either be carried in the clear, should the Responder not know it, not carried at all, should the Responder be known to have it already, or encrypted with the Responder's public key instead of the Diffie-Helhman session key, since the shared Diffie-Helhman session key will only be available subsequently.

Turning now to security issues relating to the use of a modified HIP base exchange embodying the present invention, if the Responder considers the Initiator trustworthy and competent, so that the Initiator never sends I2 messages that contain false information, never sends I2 messages unless it intends to initiate a HIP association with the Responder, and keeps the unused hash chain values and/or shared secret secured, the protocol will be as secure as the standard HIP base exchange. The modifications to the standard HIP base exchange method mostly concern the Denial-of-Service protection part of the base exchange, and less so the other parts. The remainder of the protocol flows to a large extent as for the standard HIP base exchange, with two main exceptions:

Firstly, the Initiator does not need to learn the Host Identity public key of the Recipient from the (now non-existent) R1 message, as it knows it already or can get it from elsewhere.

Secondly, the Responder's public Diffie-Hellman key $DH_R$, carried in the R1 message in the standard HIP base exchange, is now carried in the R2' message instead, as the R1 message is not available. As a result, the Initiator's public Host Identity key $PK_I$ in the I2' message cannot be encrypted with the session key, but encrypting the Initiator's Host Identity key $PK_I$ is anyway being made optional in the standard HIP base exchange protocol.

Concerning Denial of Service protection, the following observations can be made:

In the standard HIP base exchange, verifying the puzzle solution takes one hash function. In a modified HIP base exchange embodying the present invention, verifying the Paired Freshness parameter requires looking up the previous hash chain value or shared secret and computing a single hash function, unless packets have been previously lost, in which case it may require a small number of hash computations. In other words, the required CPU load is about the same, while there may be slightly increased memory access load due to the looking up of the associated state.

In the standard HIP base exchange, verifying the puzzle provides the Responder assurance that the Initiator is out there and that it has expended some CPU time solving the puzzle. In a modified HIP base exchange embodying the present invention, verifying the Paired Freshness parameter provides the Responder assurance that the Initiator has sent the I2' message at some time after it last communicated with the Responder. If a shared secret is used with a time stamp, the Responder gets additional assurance that either an attacker has managed to make the Initiator's clock to run in the future at some time in the past, or alternatively the Initiator indeed has sent the message relatively recently, i.e. within the bounds of the time stamp granularity.

In the standard HIP base exchange, the puzzle verification step relies on public information. Anyone can solve a puzzle and send the puzzle solution to the Responder, not just the Initiator. However, solving the puzzle requires CPU cycles, and therefore it is not economical to do that. That is the essence of the HIP Denial of Service protection: requiring the Initiator to do some work upfront. This is analogous in an embodiment of the present invention. In theory, anyone can reverse a hash chain, i.e. find the next unused value in a hash chain. However, doing so requires even more CPU than in the case of the HIP base exchange puzzle. On the other hand, the Initiator knows the next value of the hash chain (since it has generated the hash chain), and therefore if the Responder trusts (at least somewhat) the Initiator, and the Responder knows the last used value in the hash chain, the Responder can relatively cheaply verify that the Initiator indeed has sent a message that contains the received hash chain value after the currently stored last used value in the hash chain was sent.

Combining the assurance provided with the modified I2' message with the assumption of the Initiator being honest and competent, as outlined above, the Responder can assume at least an equal level of implied security as is provided in the case of the standard HIP base exchange. Both protocols, i.e. the standard and a modified one embodying the present invention, have a Denial-of-Service vulnerability to active man-in-the-middle attacks. A modified HIP base exchange embodying the present invention without the time stamp has a limited vulnerability on replay attacks; the time stamp helps to protect against such attacks. More specifically, if an Initiator ever sends I2' messages that have the PF parameter but not a time stamp in such a way that an attacker is able to receive the message but the intended Recipient is not, the attacker can replay the message once to the Recipient, thereby causing the Recipient to create an unnecessary HIP association, i.e. to use resources unnecessarily. However, this residual attack cannot be considered to be a large one, since each captured message may be used only once, and therefore the induced extra effort at the Recipient end is naturally limited.

As mentioned above, the pre-existing relationship between the Initiator and the Responder to create a shared state may result from a previous performance of the standard HIP base exchange between the two hosts to set up a secure HIP communications session. However, any form of pre-existing relationship between the Initiator and the Responder can be used. For example the shared state can set up manually, for example entering a shared secret into both hosts manually. Other examples would be readily apparent to the skilled person.

It is also to be noted that, if the hosts have previously run a standard HIP base exchange, they could also keep the resulting HIP association for a very long time and just use HIP UPDATE messages to create new IPsec SAs. A principal difference between using HIP UPDATES and a method embodying the present invention is that in the UPDATE message case the HIP keying material, KEYMAT, is not regenerated while in the case of an embodiment of the present invention it is regenerated.

As mentioned above, the two round trips and four messages in the standard HIP base exchange protocol can often create a performance problem. An embodiment of the present invention provides a significant technical advantage by providing an alternative HIP base exchange procedure having only a single round and two messages.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

A person skilled in the art will appreciate that embodiments of the present invention are not necessarily limited to any particular protocol or addressing scheme for each of the layers, for example in the transport or network layers, and will function within the HIP framework whatever addressing or transport protocol is used around that framework.

What is claimed is:

1. A modified Host Identity Protocol, HIP, base exchange method, having a single round and two messages, for use by first and second HIP hosts having a shared state from a pre-existing relationship, the method comprising:
   sending an authentication message from the first host to the second host, the message comprising an identifier of the first host and a cryptographic item;
   receiving the authentication message at the second host and using the identifier and information relating to the shared state to authenticate the cryptographic item; and
   following successful authentication of the cryptographic item, sending a confirmation message from the second host to the first host that indicates successful authentication.

2. The method as claimed in claim 1, wherein the identifier is a HIP identity tag.

3. The method as claimed in claim 2, wherein the HIP identity tag is a Host Identity Tag (HIT) or a Local Scope Identifier (LSI).

4. The method as claimed in claim 1 wherein authenticating the cryptographic item comprises verifying the origin of the cryptographic item.

5. The method as claimed in claim 1, comprising retrieving the shared stated information using the received identifier.

6. The method as claimed in claim 1, comprising generating or selecting the cryptographic item using the shared state information.

7. The method as claimed in claim 1, wherein the cryptographic item derives from the performance of a cryptographic function.

8. The method as claimed in claim 7, wherein the cryptographic function has at least the identifier as input.

9. The method as claimed in claim 8, wherein the cryptographic function is a hash function.

10. The method as claimed in claim 9, wherein the shared state information comprises at least the last used item from a hash chain generated from the hash function, and comprising selecting the next unused item in the hash chain for use as the cryptographic item.

11. The method as claimed in claim 10 wherein the cryptographic item is authenticated by computing the hash function using the received identifier and the received cryptographic item, and comparing the result with at least the last used item.

12. The method as claimed in claim 10, wherein the hash chain is pre-generated and at least the unused items in the hash chain stored at or accessible by the first host.

13. The method as claimed in claim 12, wherein the hash chain is generated as a result of the pre-existing relationship.

14. The method as claimed in claim 10, wherein the hash chain is dedicated for interactions between the first and second hosts.

15. The method as claimed in claim 10, wherein the hash chain is dedicated for interactions between the first hosts and a plurality of such second hosts.

16. The method as claimed in claim 1, wherein the shared state information comprises secret information exchanged between the first and second hosts as a result of the pre-existing relationship.

17. The method as claimed in claim 16, wherein the secret information comprises a cryptographic key.

18. The method as claimed in claim 16, wherein the secret information is used as input to the cryptographic function.

19. The method as claimed in claim 18, wherein the cryptographic item is authenticated by computing the cryptographic function using the received identifier and the secret information, and comparing the result with the received cryptographic item.

20. The method as claimed in claim 18, wherein a time stamp is used as input to the cryptographic function.

21. The method as claimed in claim 18, wherein a counter is used as input to the cryptographic function, and comprising incrementing the counter.

22. The method as claimed in claim 20, wherein the authentication message comprises the time stamp and/or counter, and the cryptographic item is authenticated by computing the cryptographic function using the received time stamp and/or counter, and comparing the result with the received cryptographic item.

23. The method as claimed in claim 1, wherein the shared stated information is stored at the second host.

24. The method as claimed in claim 1, comprising retrieving the shared state information from a remote server.

25. The method as claimed in claim 24, wherein the shared state information stored in the remote server is protected against modification by unauthorized parties.

26. The method as claimed in claim 24, comprising forwarding at least part of the authentication message to the remote server for retrieving the shared state information.

27. The method as claimed in claim 1, wherein the authentication message comprises the first host's public Diffie-Hellmann key.

28. The method as claimed in claim 1, wherein the authentication message comprises the first host's Host Identity public key.

29. The method as claimed in claim 1, wherein the confirmation message comprises the second host's public Diffie-Hellman key.

30. The method as claimed in claim 1, comprising signing the confirmation message with the second host's private key.

31. The method as claimed in claim 30, comprising verifying the signature at the first host using the second host's Host Identity public key.

32. The method as claimed in claim 31, wherein the second host's Host Identity public key is known to the first host as a result of the pre-existing relationship or is available from a remote server.

33. The method as claimed in claim 1, comprising creating a HIP Security Association between the first and second hosts following receipt of the confirmation message at the first host.

34. The method as claimed in claim 1, wherein the pre-existing relationship derives from having previously performed a standard HIP base exchange procedure between the first and second hosts.

35. The method as claimed in claim 1, comprising determining whether or not the authentication message is a standard HIP base exchange 12 message.

36. The method as claimed in claim 35, comprising differentiating the authentication message from a standard HIP base exchange 12 message by detecting a HIP parameter type associated with the cryptographic item.

37. The method as claimed in claim 35, comprising differentiating the authentication message from a standard HIP base exchange 12 message with reference to anyone or more of: the HIP packet type; the HIP protocol version field; a bit or some bit combination from the HIP header reserved field; a HIP control in the header Controls field; a variant in either or both of the identifiers of the first and second hosts; and the IP protocol used.

38. A communications system for performing a modified Host Identity Protocol, HIP, base exchange method, having a single round and two messages, between first and second HIP hosts of the system having a shared state from a pre-existing relationship:
the first HIP host including a HIP initiator that sends an authentication message to the second host, the authentication message including an identifier of the first host and a cryptographic item; and
the second HIP host comprising:
a HIP responder that receives the authentication message, utilizes the identifier and information relating to the shared state from the pre-existing relationship to authenticate the cryptographic item, and following successful authentication of the cryptographic item, sends a confirmation message to the first host that indicates successful authentication.

39. A modified Host Identity Protocol, HIP, base exchange method, having a single round and two messages, for use by a HIP Initiator host having a shared state from a pre-existing relationship with a HIP Responder host, the method comprising:
sending an authentication message from the HIP Initiator host to the HIP Responder host, the authentication message including an identifier of the HIP Initiator host and a cryptographic item, the authentication message being for use at the HIP Responder host to authenticate the cryptographic item using the identifier and information relating to the shared state such that, following successful authentication of the cryptographic item, a confirmation message can be sent to the HIP Initiator host that indicates successful authentication.

40. An apparatus for performing, as a Host Identity Protocol, HIP, Initiator host, a modified HIP base exchange method having a single round and two messages, with a HIP Responder host with which the HIP Initiator host has a shared state from a preexisting pre-existing relationship, the apparatus comprising:
a HIP initiator that sends an authentication message to the HIP Responder host and receives a confirmation message from the HIP Responder host, wherein the authentication message includes an identifier of the HIP Initiator host and a cryptographic item, the authentication message being for use at the HIP Responder host to authenticate the cryptographic item using the identifier and information relating to the shared state such that, following successful authentication of the cryptographic item, the HIP Responder host sends the confirmation message to the HIP Initiator host indicating successful authentication.

41. A modified Host Identity Protocol, HIP, base exchange method, having a single round and two messages, for use by a HIP Responder host having a shared state from a pre-existing relationship with a HIP Initiator host, the method comprising:
receiving from the HIP Initiator host an authentication message comprising an identifier of the HIP Initiator host and a cryptographic item,
using the identifier and information relating to the shared state to authenticate the cryptographic item and,
following successful authentication of the cryptographic item, sending a confirmation message to the HIP Initiator host that indicates successful authentication.

42. An apparatus for performing, as a Host Identity Protocol, HIP, Responder host, a modified HIP base exchange method, having a single round and two messages, with a HIP Initiator host with which the HIP Responder host has a shared state from a pre-existing relationship, the apparatus comprising:
a HIP responder that receives from the HIP Initiator host, an authentication message that includes an identifier of the HIP Initiator host and a cryptographic item, utilizes the identifier and information relating to the shared state to authenticate the cryptographic item and, following successful authentication of the cryptographic item, sends a confirmation message to the HIP Initiator host indicating successful authentication.

* * * * *

UNITED STATES PATENT AND TRADEMARK OFFICE
CERTIFICATE OF CORRECTION

PATENT NO. : 7,996,675 B2
APPLICATION NO. : 11/917099
DATED : August 9, 2011
INVENTOR(S) : Nikander It is certified that error appears in the above-identified patent and that said Letters Patent is hereby corrected as shown below:

On the Title Page, in Item (57), under "ABSTRACT" in Column 2, Line 7, delete "(HITI)" and insert -- $(HIT_I)$ --, therefor.

In Column 2, Lines 40-47, delete "Applications......below." and insert the same at Line 41, as a new paragraph.

In Column 3, Line 19, delete "Diffie-Helhman" and insert -- Diffie-Hellman --, therefor.

In Column 3, Line 26, delete "Diffie-Helhnan" and insert -- Diffie-Hellman --, therefor.

In Column 5, Line 65, delete "Diffie-Hellmann" and insert -- Diffie-Hellman --, therefor.

In Column 8, Line 13, delete "HP" and insert -- HIP --, therefor.

In Column 8, Line 65, delete "$H_i$=hash($H_{i+}$)." and insert -- $H_i$=hash($H_{i+1}$). --, therefor.

In Column 9, Line 36, delete "HIT," and insert -- $HIT_I$, --, therefor.

In Column 9, Line 64, delete "Diffie-Helhnan" and insert -- Diffie-Hellman --, therefor.

In Column 10, Line 28, delete "HIT" and insert -- $HIT_I$ --, therefor.

In Column 10, Line 35, delete "HIT," and insert -- $HIT_I$, --, therefor.

In Column 11, Line 20, delete "Diffie-Helhman" and insert -- Diffie-Hellman --, therefor.

In Column 13, Line 57, delete "Diffie-Helhman" and insert -- Diffie-Hellman --, therefor.

In Column 13, Line 58, delete "Helhman" and insert -- Hellman --, therefor.

In Column 17, Lines 8-9, in Claim 27, delete "Diffie-Hellmann" and insert -- Diffie-Hellman --, therefor.

Signed and Sealed this
Fifth Day of February, 2013

Teresa Stanek Rea
*Acting Director of the United States Patent and Trademark Office*